UNITED STATES PATENT OFFICE.

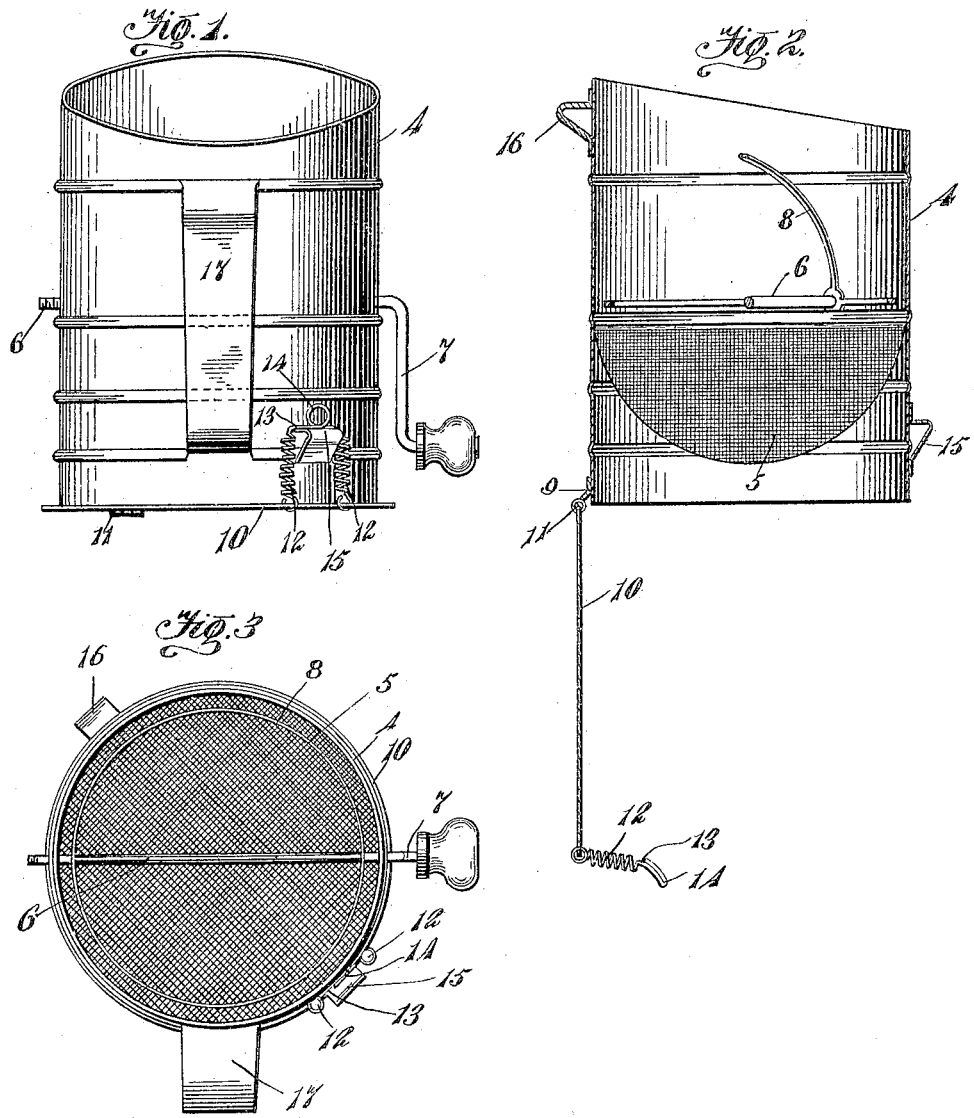

HELEN MACKAY, OF PRINCE ALBERT, CANADA.

FLOUR-SIFTER.

No. 821,109.　　　　Specification of Letters Patent.　　　　Patented May 22, 1906.

Application filed October 6, 1905. Serial No. 281,584.

*To all whom it may concern:*

Be it known that I, HELEN MACKAY, a subject of the King of Great Britain, residing at Prince Albert, district of Saskatchewan, North-West Territories, Canada, have invented certain new and useful Improvements in Flour-Sifters; and I do hereby declare that the following is a full, clear, and exact description of the invention, such as will enable others skilled in the art to which it appertains to make and use the same.

My invention relates to flour-sifters.

The object of my invention is to provide an ordinary form of rotary sifter with means whereby the flour may be maintained therein while the device is being carried from place to place; and my invention consists of the construction, combination, and arrangement of parts, as herein illustrated, described, and claimed.

In the accompanying drawings, forming part of this application, I have illustrated one form of embodiment of my invention, in which drawings similar reference characters designate corresponding parts, and in which—

Figure 1 is an elevation of the sifter looking from the side on which is placed the handle. Fig. 2 is a central vertical section through the sifter, and Fig. 3 is a plan view.

Referring to the drawings, 4 designates an ordinary form of receptacle in which is disposed a sieve 5 of hemispherical shape. Disposed across the receptacle above the sieve is a shaft 6, having on its outer end a crank 7 and intermediate of its ends carrying the agitators 8, all of which construction is well known.

On the lower edge of the outer wall of the receptacle is formed or secured an ear 9, to which is pivotally secured the bottom 10, as by the pin or pivot 11. Secured to one edge of the bottom 10 is a double spring 12, which terminates in a yoke 13, having thereon an integral ring 14.

Disposed or formed on the wall of the receptacle adjacent its bottom on the side opposite to the ear 9 is a projection or lug 15. When the bottom is in the position shown in Fig. 1, the yoke 13 is adapted to engage over the projection 15 and hold the bottom tightly in position to maintain the contents of the receptacle therein. The ring 15 affords a ready means whereby the finger of the operator may be inserted and the bottom released from its closed position. Adjacent its upper end and on the exterior wall of the receptacle on the same side as the ear 9 is a second lug or projection 16, which is also adapted to receive the yoke 13 and hold the bottom close to the side of the receptacle and out of the way of the operator. The receptacle 4 is provided with the ordinary form of handle 17 usually found in devices of this character.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claim or of mechanical equivalents to the structures set forth.

Having fully described my invention, what I claim as new, and desire to secure by Letters Patent, is—

In combination with a sifter comprising a receptacle, a sieve, and a rotary agitator, a hinged bottom closure for the receptacle, springs secured to the closure and terminating in a yoke having a ring thereon, and retaining members on the side of the receptacle adapted to be engaged by the yoke.

In witness whereof I have hereunto set my hand in the presence of two witnesses.

HELEN MACKAY.

Witnesses:
　H. E. ROSS,
　W. E. WITT.